Patented June 2, 1925.

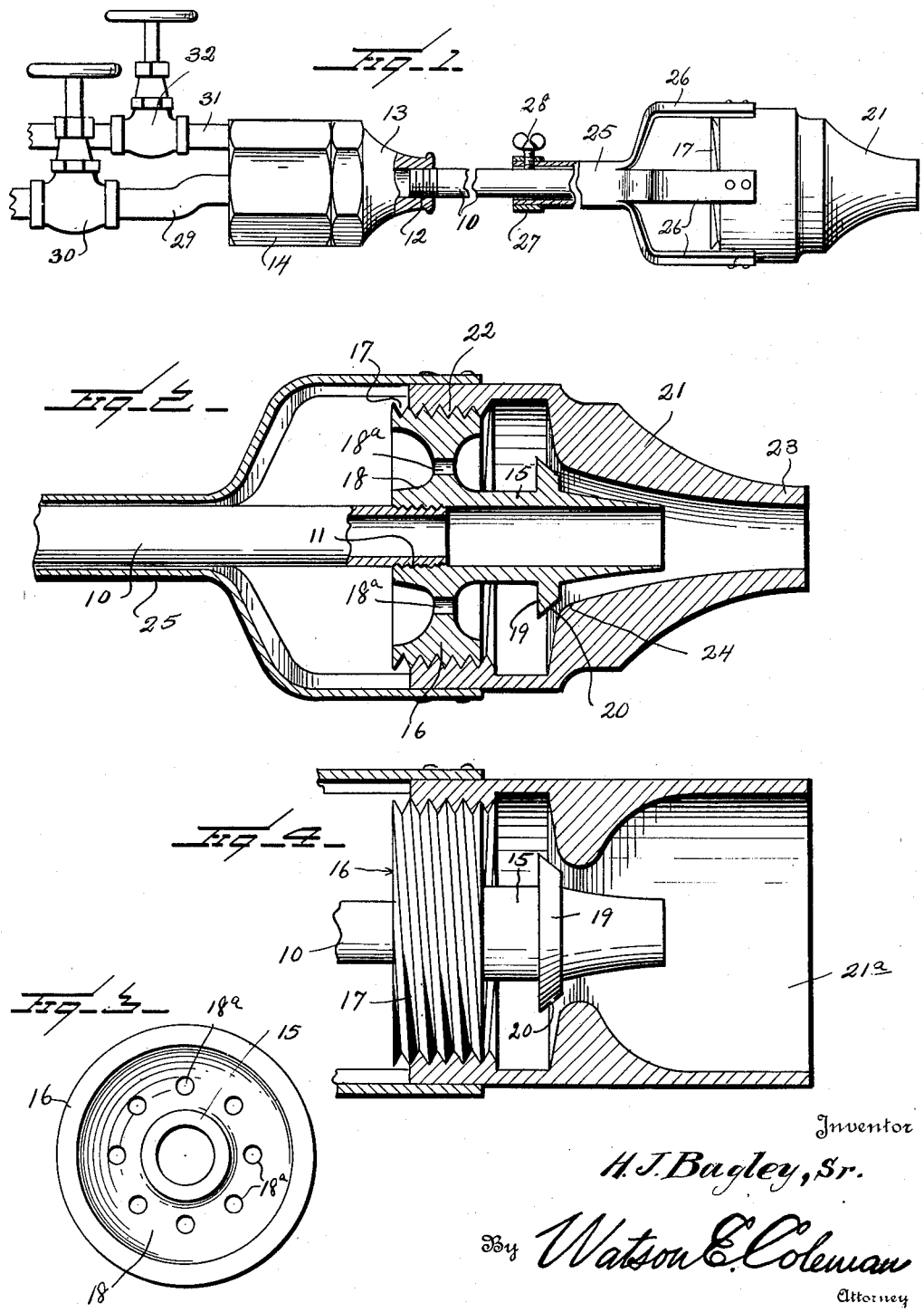

1,540,676

UNITED STATES PATENT OFFICE.

HENRY J. BAGLEY, SR., OF BROOKLYN, NEW YORK.

COMBUSTION HEAD OR BURNER FOR BLOWTORCHES.

Application filed June 24, 1924. Serial No. 722,097.

*To all whom it may concern:*

Be it known that I, HENRY J. BAGLEY, Sr., a citizen of the United States, residing at Brooklyn, in the county of Kings and State of New York, have invented certain new and useful Improvements in Combustion Heads or Burners for Blowtorches, of which the following is a specification, reference being had to the accompanying drawings.

This invention relates to blow torches or burners, and particularly to a blow torch adapted to be used with oil or other liquid fuel.

The general object of the invention is to provide a blow torch wherein the amount of air admitted to the torch for admixture with the atomized fuel may be varied and controlled so as to secure the best possible results, and in this connection to provide a construction of this character wherein the amount of air passing into the torch and mixing with the atomized fuel may be controlled and adjusted while the burner is ignited.

A further object is to provide a torch of this character which is readily adjustable as regards the admission of air, which is very simple, and which has been found particularly effective for cremating purposes.

A still further object is to provide a construction of this character particularly designed to be used with the atomizing block or head shown in my Patent #1,412,689 granted in April, 1922, or which can be used, if desired, with any standard units now on the market.

Another object is to provide a blow torch which will burn kerosene, distillate or fuel oil of medium gravity economically and at the same time secure high heating qualities, and which is not liable to carbonization.

Still another object is to provide a blow torch which does not require any preheating of the fuel but will give an instantaneous ignition while the torch is yet cold.

Other objects will appear in the course of the following description.

My invention is illustrated in the accompanying drawings, wherein:—

Figure 1 is an elevation of a blow torch constructed in accordance with my invention partly broken away;

Figure 2 is a longitudinal sectional enlarged view through my improved burner for the blow torch;

Figure 3 is a rear elevation of the nozzle 15;

Figure 4 is a longitudinal sectional view of a slightly modified form of burner;

Referring to these drawings, it will be seen that the blow torch proper comprises the centrally disposed tube 10. This tube is exteriorly screw-threaded at 11 at one end and screw-threaded at 12 at the other end, this end being adapted to engage in the nozzle-like extremity 13 of an atomizing head 14.

Attached to the extremity of the pipe 10 is the interior nozzle 15, this interior nozzle being formed at its base with the annular flange 16, this flange being exteriorly screw-threaded at 17. The thickness of the flange is reduced around the middle of the flange, as at 18, and the flange is formed with a plurality of apertures 18$^a$ passing through this reduced thickness of the flange. The flange is increased in thickness at its outer margin simply to provide a sufficient number of relatively coarse screw-threads. Between the flange 16 and the extremity of the interior nozzle 15 there is formed a valve flange 19, the margin of which is beveled or rounded, as at 20.

Fitting over the interior nozzle 15 is the shell 21 which is formed of steel or cast iron and which at its rear end is interiorly screw-threaded, as at 22, to provide screw-threads fitting the screw-threads 17. The rear portion of the shell is cylindrical in form but the forward end of the shell may have any desired shape, depending upon the flame which is to be discharged. As illustrated in Figure 2, the forward end 23 of the shell is reduced exteriorly or tapered. The inner bore of this nozzle expands rearwardly in a slight curve and at the junction of this wall with the main interior chamber of the nozzle there is formed a seat 24, with which the beveled edges 20 of the valve 19 are adapted to engage. It will be understood, however, that ordinarily at no time will this valve 19 be closed tightly against the seat 24, as always in the function of these valves some air must be allowed to flow into the nozzle 23 around the central fuel duct or nozzle 15.

Attached to the butt end of the shell 21 is the forward end of a tubular shank 25. The forward end of this tubular shank is split so as to provide a plurality of outwardly and then forwardly directed arms 26, the forward extremities of these arms being riveted, screwed or otherwise attached to the butt end of the shell. It is obvious now that by turning this tube or sleeve 25, the shell 21 may be advanced or retracted with relation to the inner nozzle 15.

In order to hold the nozzle in its adjusted position, I provide the rear end of the tubular shank 25 with the collar 27, and extending through this collar is a set screw 28 which, when it is clamped inward against the pipe 12, locks the parts in their adjusted position.

So far I have described my specific invention which forms the subject-matter of the present application, but in order that one of its uses may be understood I have illustrated in conjunction therewith the atomizing block and part of the pipe system which is particularly described and claimed in Patent #1,412,689. The atomizing block 14 is so arranged as to atomize the oil and thoroughly mix the oil with steam or air. The air pipe is designated 29 and is provided with the controlling valve 30. The oil pipe is designated 31 and is provided with the controlling valve 32. As before stated, air and oil come through these pipes 29 and 31 respectively and pass into the mixing head or atomizing block 14, issue through the extremity of the nozzle 13 into the pipe 10 which is screwed at 12 into this extremity, and this atomized fuel is discharged into the nozzle 15 and out therefrom. As it passes outward through the nozzle 23, it draws with it air from the interior of the shell 21, this air being supplied from the apertures 18. If too much air is passing into the nozzle 23 around the projected stream of ignited vapor, then the sleeve 25 may be rotated to rotate the member 15 and shift the valve flange 19 nearer to the seat or part 24. If, on the other hand, too little air is passing in, the shell 21 is screwed in the reverse direction to increase the area of the annular aperture through which the air passes into the nozzle 23. A very fine adjustment may be secured so that exactly the right amount of air may be admitted and in exact proportion to the amount of fuel which is being discharged through the nozzle 15. This adjustment may be secured when the stream of oil is ignited and burning.

While I have illustrated a specific form of shell 21 with a nozzle 23, I do not wish to be limited to this as a form of burner nozzle may be used such as shown in Figure 4, where the nozzle is approximately cylindrical, the shell and nozzle being designated 21ª. Here again, however, provision is made, as shown in Figure 2, whereby the amount of air may be controlled. While this device is particularly intended for use in crematories, yet it is obvious that the device might be used for a large number of other purposes, as a burner or torch, and that the flame issuing from the burner or torch be modified by using different shaped shells 21. While the broad idea of a burner constructed in accordance with my invention is old, the particular advantages resident to the burner are due to the simplicity of its construction and the manner in which the air passing around the burner nozzle may be controlled. Furthermore, it is obvious that this device may be used with different liquid fuels by simply changing the amount of air which enters the nozzle and that the length of the flame will also be governed by the amount of air entering the nozzle. Torches of this character do not carbonize because a sufficiency of air is admitted to secure perfect combustion, and with a torch of this character no preheating is required but the mixture will ignite immediately as soon as a match is touched to the forward end of the nozzle 23 and the mixture is projected out through the nozzle.

The torch may be obviously modified in many respects without departing from the spirit of the invention.

I claim:—

1. A blow torch of the character described including a pipe adapted to convey an atomized fuel, a nozzle into which the pipe opens, the nozzle having an outwardly projecting portion which is exteriorly screw-threaded and formed to provide a plurality of air openings, an exterior shell open at its forward end and having interior screw-threads engaged with the screw-threads on said projecting portion whereby the shell may be longitudinally adjusted, the nozzle having a flange, and the shell being contracted, the adjustment of the shell controlling the space between said flange and the constriction in said shell thereby controlling the amount of air passing from the interior of the shell to the nozzle, and means for shifting the shell relative to the nozzle comprising a member surrounding the fuel pipe and extending longitudinally therealong, and arms extending radially from said member and engaging the rear end of the shell, said member carrying means whereby it may be held to adjusted positions.

2. A blow torch including a pipe adapted to convey atomized fuel and terminating in a nozzle, the nozzle having an outwardly projecting flange and having an annular screw-threaded portion, a shell, the forward end of which has a contracted bore adapted to coact with the flange to limit the passage of air between the flange and the wall of the bore, the rear end of the shell being screw-threaded, means for rotating the shell to thereby adjust the shell toward or from said flange on the nozzle comprising a sleeve loosely surrounding the fuel pipe, and arms extending radially from the sleeve and engaging the rear end of the shell, said sleeve having means whereby it may be held in adjusted positions.

In testimony whereof I hereunto affix my signature.

HENRY J. BAGLEY, Sr.